United States Patent
Busaba et al.

(10) Patent No.: US 9,864,639 B2
(45) Date of Patent: *Jan. 9, 2018

(54) MANAGEMENT OF RESOURCES WITHIN A COMPUTING ENVIRONMENT

(71) Applicant: INTERNATIONAL BUSINESS MACHINES CORPORATION, Armonk, NY (US)

(72) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/356,893

(22) Filed: Nov. 21, 2016

(65) Prior Publication Data

US 2017/0068573 A1 Mar. 9, 2017

Related U.S. Application Data

(63) Continuation of application No. 14/684,773, filed on Apr. 13, 2015, now Pat. No. 9,501,323, which is a (Continued)

(51) Int. Cl.
*G06F 9/46* (2006.01)
*G06F 9/50* (2006.01)
(Continued)

(52) U.S. Cl.
CPC ............. *G06F 9/5038* (2013.01); *G06F 9/38* (2013.01); *G06F 9/45533* (2013.01);
(Continued)

(58) Field of Classification Search
None
See application file for complete search history.

(56) References Cited

U.S. PATENT DOCUMENTS 5,339,413 A * 8/1994 Koval ................... G06F 13/387
709/231
6,148,322 A 11/2000 Sand et al.
(Continued)

FOREIGN PATENT DOCUMENTS

| CN | 1985242 A | 6/2007 |
|---|---|---|
| CN | 101369224 A | 2/2009 |
| CN | 102566974 A | 7/2012 |

OTHER PUBLICATIONS

Francisco Cazorla; Predictable Performance in SMT Processors; Apr. 14, 2004; ACM.*
(Continued)

*Primary Examiner* — Dong Kim
(74) *Attorney, Agent, or Firm* — Margaret McNamara, Esq.; Blanche E. Schiller, Esq.; Heslin Rothenberg Farley & Mesiti P.C.

(57) ABSTRACT

Resources in a computing environment are managed, for example, by a hardware controller controlling dispatching of resources from one or more pools of resources to be used in execution of threads. The controlling includes conditionally dispatching resources from the pool(s) to one or more low-priority threads of the computing environment based on current usage of resources in the pool(s) relative to an associated resource usage threshold. The management further includes monitoring resource dispatching from the pool(s) to one or more high-priority threads of the comput-
(Continued)

ing environment, and based on the monitoring, dynamically adjusting the resource usage threshold used in the conditionally dispatching of resources from the pool(s) to the low-priority thread(s).

21 Claims, 7 Drawing Sheets

Related U.S. Application Data continuation of application No. 13/783,334, filed on Mar. 3, 2013, now Pat. No. 9,021,495, which is a continuation of application No. 13/615,704, filed on Sep. 14, 2012, now Pat. No. 9,021,493.

(51) Int. Cl.
    *G06F 9/38* (2006.01)
    *G06F 9/455* (2006.01)
    *G06F 9/48* (2006.01)

(52) U.S. Cl.
    CPC ............. *G06F 9/4881* (2013.01); *G06F 9/50* (2013.01); *G06F 9/5011* (2013.01); *G06F 9/5016* (2013.01); *G06F 9/5077* (2013.01); *G06F 2009/45591* (2013.01); *G06F 2209/483* (2013.01); *G06F 2209/504* (2013.01); *G06F 2209/507* (2013.01); *G06F 2209/508* (2013.01); *G06F 2209/5021* (2013.01); *Y02B 60/142* (2013.01)

(56) References Cited

U.S. PATENT DOCUMENTS

| | | | |
|---|---|---|---|
| 6,216,220 B1 | 4/2001 | Hwang | |
| 6,223,204 B1 | 4/2001 | Tucker | |
| 6,718,533 B1* | 4/2004 | Schneider | G06F 8/10 700/97 |
| 6,862,635 B1 | 3/2005 | Alverson et al. | |
| 7,093,253 B2 | 8/2006 | Beghtel et al. | |
| 7,137,019 B2 | 11/2006 | Hellerstein et al. | |
| 7,155,600 B2 | 12/2006 | Burky et al. | |
| 7,155,716 B2 | 12/2006 | Hooman et al. | |
| 7,313,673 B2 | 12/2007 | Abernathy et al. | |
| 7,421,592 B1* | 9/2008 | Kadatch | G06F 11/3423 707/999.01 |
| 7,487,504 B2 | 2/2009 | Peterson | |
| 7,565,652 B2 | 7/2009 | Janssen et al. | |
| 7,698,504 B2 | 4/2010 | Cypher et al. | |
| 7,797,468 B2 | 9/2010 | Shin et al. | |
| 7,904,685 B1 | 3/2011 | Alverson et al. | |
| 8,108,659 B1* | 1/2012 | Le Grand | G06F 9/526 712/225 |
| 8,930,950 B2 | 1/2015 | Busaba et al. | |
| 2004/0215939 A1 | 10/2004 | Armstrong et al. | |
| 2006/0037018 A1 | 2/2006 | Fang et al. | |
| 2006/0184768 A1* | 8/2006 | Bishop | G06F 9/30149 712/215 |
| 2007/0061783 A1 | 3/2007 | Prakash | |
| 2008/0295105 A1* | 11/2008 | Ozer | G06F 9/3851 718/103 |
| 2009/0199190 A1 | 8/2009 | Chen et al. | |
| 2009/0260013 A1* | 10/2009 | Heil | G06F 15/7825 718/103 |
| 2010/0211948 A1* | 8/2010 | Philip | G06F 9/526 718/100 |
| 2011/0088041 A1 | 4/2011 | Alameldeen et al. | |
| 2011/0191779 A1* | 8/2011 | Ujibashi | G06F 9/46 718/102 |
| 2011/0252069 A1* | 10/2011 | Brodie | G06F 9/50 707/799 |
| 2012/0023502 A1* | 1/2012 | Marr | G06F 9/4881 718/103 |
| 2014/0082625 A1 | 3/2014 | Busaba et al. | |
| 2014/0082626 A1 | 3/2014 | Busaba et al. | |
| 2015/0212858 A1 | 7/2015 | Busaba et al. | |

OTHER PUBLICATIONS

Cazorla, Francisco et al., "Predictable Performance in SMT Processors," ACM 2004, Apr. 2004, pp. 1-11.

Doral, Gautham K. et al., "Transparent Threads: Resource Sharing in SMT Processors for High Single-Thread Performance," Sep. 2002, pp. 1-12.

Ghattas, Rony et al., "Preemption Threshold Scheduling: Stack Optimality, Enhancements and Analysis," Proceedings of the 13th IEEE Real-Time Technology and Applications Symposium (RTAS 2007 (no other date information available)), pp. 147-157.

Notice of Allowance for U.S. Appl. No. 13/615,704 dated Dec. 23, 2014, pp. 1-20.

Notice of Allowance for U.S. Appl. No. 13/783,334 dated Dec. 23, 2014, pp. 1-12.

Office Action for U.S. Appl. No. 13/615,704 dated Jun. 18, 2014, pp. 1-30.

Office Action for U.S. Appl. No. 13/783,334 dated Jun. 12, 2014, pp. 1-29.

Wang, Yun et al., "Scheduling Fixed-Priority Tasks with Preemption Threshold," 6th Int'l Conf. on Real-Time Computing Systems and Applications, 1999 (no other date information available), pp. 328-335.

z/Architecture—Principles of Operation, IBM Publication No. SA22-7832-08, Ninth Edition, Aug. 2010, pp. 1-1496.

Notice of Allowance for U.S. Appl. No. 14/684,773 dated Jul. 29, 2016, pp. 1-30.

\* cited by examiner

MANAGEMENT OF RESOURCES WITHIN A COMPUTING ENVIRONMENT

This application is a continuation of co-pending U.S. Ser. No. 14/684,773, entitled "MANAGEMENT OF RESOURCES WITHIN A COMPUTING ENVIRONMENT," filed Apr. 13, 2015, which is a continuation of U.S. Pat. No. 9,021,495, entitled "MANAGEMENT OF RESOURCES WITHIN A COMPUTING ENVIRONMENT," issued Apr. 28, 2015, which is a continuation of U.S. Pat. No. 9,021,493, entitled "MANAGEMENT OF RESOURCES WITHIN A COMPUTING ENVIRONMENT," issued Apr. 28, 2015, each of which is hereby incorporated herein by reference in its entirety.

BACKGROUND

An aspect of the invention relates, in general, to processing within a computing environment, and in particular, to facilitating managing resources within the computing environment to be used in execution of threads.

A thread typically exists within a process, and a process may have multiple threads that share resources, such as memory. A thread is considered the smallest unit of processing that can be scheduled by an operating system. A thread can execute on a processor with no other threads executing thereon or on a processor with other threads. In the case where the thread is the only thread executing on the processor, the processor is said to be executing in single thread mode. However, in the case in which the thread is executing with other threads, the processor is said to be in simultaneous multithreading (SMT) mode.

In simultaneous multithreading mode, hardware resources are shared among multiple software threads executing on a machine. Each thread appears to have its own complete set of architecture hardware. Furthermore, in superscalar processors, it is common to have multiple execution pipelines that can be shared among the threads being dispatched into the hardware. Though SMT provides an efficiency of hardware, allowing multiple threads to rapidly share the execution resources available, it comes with a performance cost of the individual threads. It is common for a thread that is alone on a processor to execute more rapidly than if that thread shared resources with another thread. This is because with SMT there may be resource contention issues between threads.

SUMMARY

Shortcomings of the prior art are overcome and additional advantages are provided through the provision of a computer program product for facilitating managing of resources in a computing environment. The computer program product includes, for instance, a computer readable storage medium readable by a processing circuit and storing instructions for execution by the processing circuit for performing a method including: controlling, by a hardware controller, dispatching of resources from at least one pool of resources to be used in execution of threads, the controlling including conditionally dispatching resources from one pool of resources of the at least one pool of resources to at least one low-priority thread of the computing environment based on usage of resources in the one pool of resources relative to a resource usage threshold associated with the one pool of resources, wherein the one pool of resources comprises resources of one selected type of resource, and wherein the resource usage threshold indicates a level at which dispatching of low-priority threads is to at least be throttled.

Computer systems and methods relating to one or more aspects of the present invention are also described and may be claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

Figure 1A:
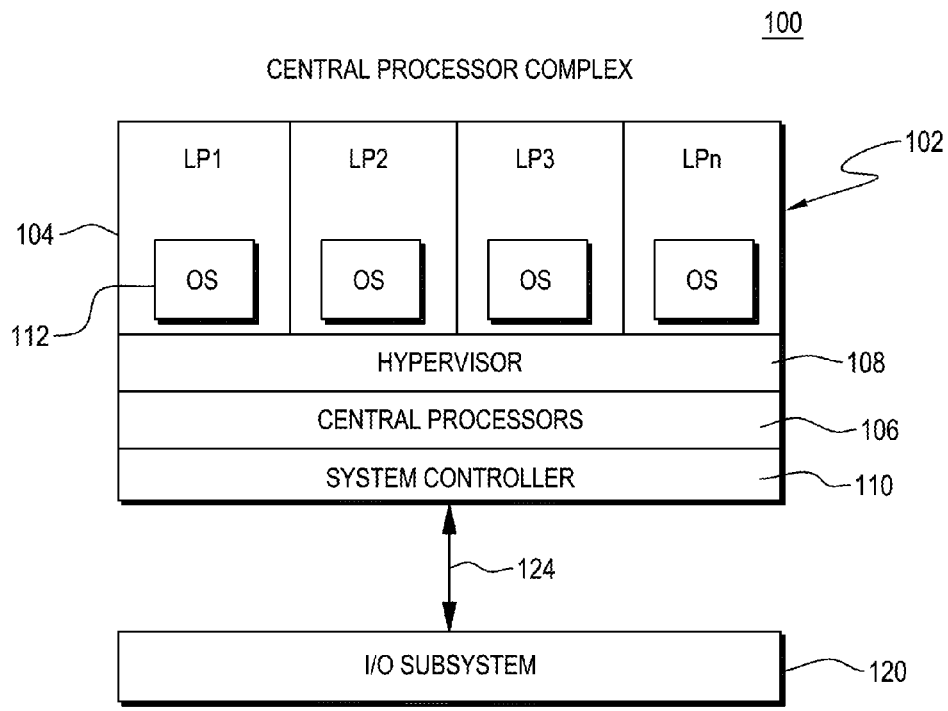
FIG. 1A depicts one embodiment of a computing environment to incorporate and use one or more aspects of the present invention.

Note that as used herein, dispatching of hardware resources occurs when an instruction for a particular thread is dispatched. As used below, the dispatching of a resource is thus employed synonymous with the dispatch of an instruction. The types of resources dispatched are based on the type of instruction dispatched, and the resources of each type are said to exist in a resource pool of that resource type.

One embodiment of a computing environment to incorporate and use one or more aspects of the present invention is described with reference to FIG. 1A. A computing environment 100 is based, for instance, on the z/Architecture® offered by International Business Machines Corporation, Armonk, N.Y. The z/Architecture® is described in an IBM Publication entitled, "z/Architecture—Principles of Operation," IBM® Publication No. SA22-7832-08, Ninth Edition, August 2010, which is hereby incorporated herein by reference in its entirety. In one example, a computing environment based on the z/Architecture® includes a System z® server offered by International Business Machines Corporation, Armonk, N.Y. IBM®, z/Architecture® and System z®, as well as z/OS® mentioned below, are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to an input/output (I/O) subsystem 120. Central processor complex 102 includes, for instance, one or more partitions 104 (e.g., logical partitions LP1-LPN), one or more central processors 106, a hypervisor 108 (e.g., a logical partition manager), and a system controller 110, each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and firmware keeps a program in a logical partition from interfering with a program in a different logical partition. This allows several different logical partitions to operate on a single processor or multiple physical processors in a time-sliced manner.

As used herein, firmware includes, e.g., the microcode, millicode, and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In this particular example, each logical partition has a resident operating system 112, which may differ for one or more logical partitions. In one embodiment, operating system 112 is the z/OS® operating system, offered by International Business Machines Corporation, Armonk, N.Y. Further, in this example, each logical partition has assigned thereto a portion of system main storage (memory), which is referred to as a zone.

A logical partition 104 includes one or more logical processors. Each logical processor may have a central processor 106 permanently allocated thereto, or there may be a pool of central processors 106 available for dynamic allocation to any group of logical processors, possibly spanning multiple logical partitions 104.

Logical partitions 104 are managed by hypervisor 108 implemented, for instance, by firmware running on processors 106. Logical partitions 104 and hypervisor 108 each comprise one or more programs residing in respective portions of main storage associated with the central processor. One example of hypervisor 108 is the Processor Resource/Systems Manager™ (PR/SM), offered by International Business Machines Corporation, Armonk, N.Y.

Central processors 106 are coupled to, but separate from, system controller 110. System controller 110 is, for instance, a hardware component that controls access to memory and caches within the central processors, and communicates between the central processors and input/output subsystem 120. The system controller is responsible for the queuing, serialization, and execution of requests made by the central processors and the I/O subsystem. In one example, it is responsible for sending commands to particular central processors and/or broadcasting commands to multiple central processors. The system controller may be a centralized component or its functions may be distributed. The system controller is not a processor or core; for example, it does not execute user applications. Instead, it is the communications mechanism between the I/O subsystem and the central processors.

Further details regarding central processors 106 are described with reference to FIG. 1B. In one example, a central processor 106 includes one or more cores or processors 150, which are the physical processors that are allocated to one or more logical partitions. A central processor is considered part of a node, and each node includes one or more central processors. A logical partition can span nodes in which one or more central processors from one node and one or more central processors from another node can be assigned to the logical partition.

Further, in accordance with an aspect of the present invention, the one or more processors 150 of the central processor 106 each include a controller 151 (e.g., hardware controller) used to monitor the processors, and in particular, the threads executing on that processor and, in one embodiment, the pool(s) of available execution resources 152, such as available hardware registers, being accessed by the threads. The controllers 151 control dispatch of resources from the respective pools of resources 152 to threads, such as low-priority threads.

Figure 1B:
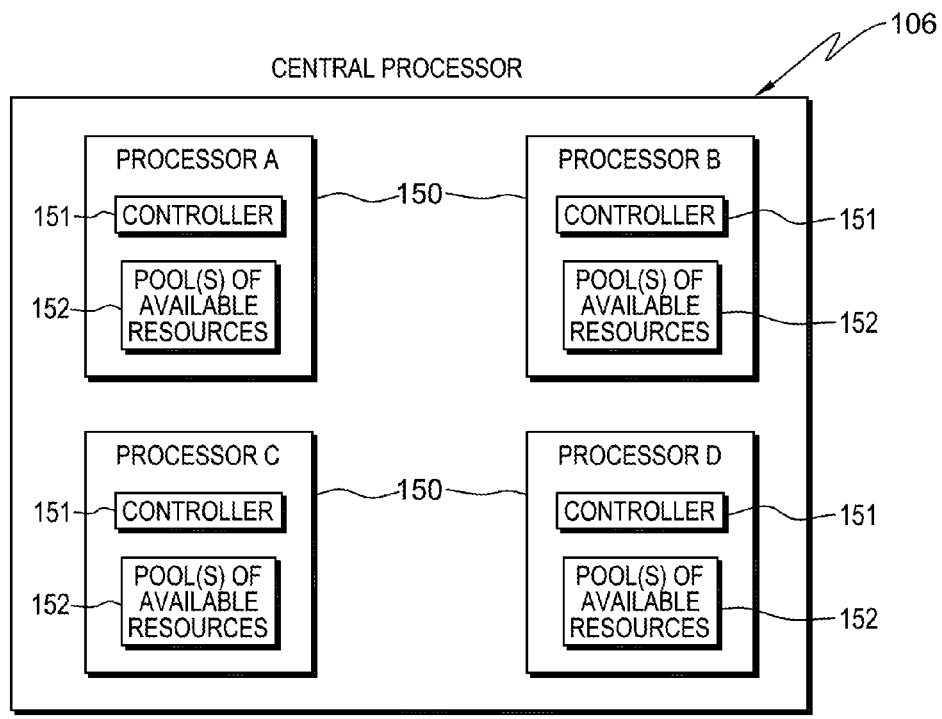
FIG. 1B depicts further details of the central processors of FIG. 1A, in accordance with an aspect of the present invention.

In one embodiment, the computing environment of FIGS. 1A & 1B may be implemented with out-of-order processors. Out-of-order processors break processing of instructions into multiple steps, with the goal of allowing a processor to avoid a class of stalls that occurs when data needed to perform an operation is unavailable. The out-of-order processors fill such time slots with instructions that are ready to execute, and then re-order the results at the end to present the appearance that the instructions were processed in order.

Out-of-order processors require a significant amount of architected hardware resources to achieve high performance. A code executing in a thread determines the amount of system resources necessary to achieve high performance. The more system resources required to achieve high execution performance, the larger the out-of-order window the processor is said to have. In other words, in code where there is a high degree of dependency (e.g., results of instruction A are needed in computation of instruction B), the more instructions will be in-flight for that processor, and the more hardware resources will be consumed by that thread during execution. Furthermore, certain threads executing in a processor may be high-priority threads requiring high performance or low execution latency, and certain threads may be low-priority threads (such as, for example, a payroll computation that may only need to complete a particular job over the course of weeks). Coarse-grained thread priority may be used in software to schedule threads based on the priority of the task at hand, but once a thread is sent to execute on hardware, the various threads are traditionally dispatched to system hardware resources with similar priority, that is, regardless of any relative priority between the threads.

Disclosed herein is a facility for managing resources of a computing environment, aspects of which may be implemented as a computer system, method or computer program product, as described further herein. The management facility includes controlling, by a hardware controller, dispatching of instructions for a particular thread based on the priority of that thread and the resources available in the processor where the thread is executing. Once an instruction for a particular thread is dispatched into the issue queue, resources from the respective pool(s) of available resources (such as a pool of hardware registers) are dispatched for that instruction's execution, making those resources unavailable for other instructions that need to dispatch. If the resource pool for a particular resource type (such as a physical floating point register) is empty at the time and instruction is ready to dispatch, that instruction is stalled at dispatch until an executing instruction using the resource completes execution, freeing up that resource. Avoiding dispatch stalling of high-priority threads is, in one aspect, addressed by the management protocol presented herein. The controlling includes conditionally dispatching instructions on a low-priority thread based on the resources needed by that instruction and the amount of resources available in the respective pool(s) of resources. The threshold of available resources for each resource pool may be adjusted dynamically to maximize system performance while minimizing dispatch stalling of high-priority threads.

In particular, resource management may include monitoring dispatching of resources from the one pool of resources to at least one high-priority thread of the computing environment, wherein the at least one high-priority thread has a higher priority than the at least one low-priority thread, and based on the monitoring, dynamically adjusting the resource usage threshold associated with the one pool of resources and used in the conditionally dispatching of resources from the one pool of resources to the at least one low-priority thread. In one implementation, such a management facility is employed in a computing environment comprising out-of-order processors.

More particularly, disclosed herein is a management facility where one or more pools of available hardware resources are monitored by controller hardware. Once the in use hardware resources for a particular resource pool rises above a respective threshold, which is automatically dynamically configured by the processor to maximize processor throughput while avoiding dispatch stalling of high-priority threads, dispatch of resources to low-priority threads is modified in order to facilitate reserving the remaining resources in the pool for use in execution of one or more high-priority threads. This modified resource dispatch to the low-priority thread is facilitated by delaying, or momentarily stalling, the dispatch of the instruction for the low-priority thread. Dispatch stalling the low-priority thread does not reduce, and may increase, the dispatch rate of the high-priority threads by allowing the high-priority thread(s) to use the dispatch cycle the low-priority thread would have used. The duration of the stalling of the low-priority thread is such that resource stalls are minimized for a high priority thread, yet starvation of execution resources to the low-priority thread does not result in failure of that thread to make proper forward progress. Note that as used herein, dispatch is where instructions are dispatched into the issue queue and hardware resources are allocated to instructions, and those instructions are then said to be in-flight. As the instructions in-flight complete and hardware resources free up, then the in use system resources will drop below the resource usage threshold, and dispatch of the low-priority threads can return to normal. In one embodiment of this concept, the controller hardware could momentarily halt dispatching of low-priority threads when currently in use resources in a particular pool of system resources rises above the respective threshold, or alternatively, the controller or dispatch hardware could throttle a dispatch rate of those resources to low-priority threads, which has the advantage of not completely stopping dispatch of low-priority threads, thereby avoiding starvation of those threads (which would result in failure to make forward progress on the low-priority threads).

Figure 2:
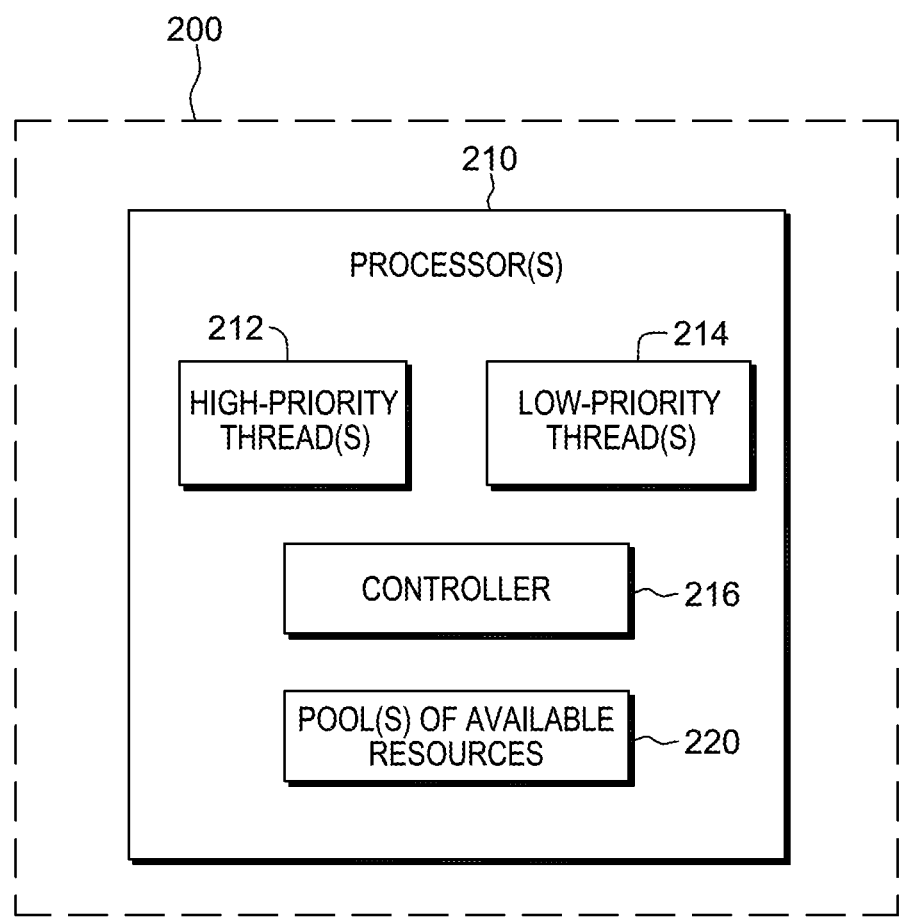
FIG. 2 depicts another embodiment of a computing environment comprising one or more processors executing multiple threads using resources in one or more pools of resources, the dispatching of which is controlled, in accordance with one or more aspects of the present invention.

FIG. 2 is a further depiction of one embodiment of a computing environment 200, such as the computing environment described above in connection with FIGS. 1A & 1B. In this depiction, multiple threads 212, 214 are to execute on one or more processors 210. In order to execute, the threads require the controller 216 to provide resources from one or more pools of resources 220 provided for use in the execution of the threads. In this embodiment, the multiple threads 212, 214 include one or more high-priority threads 212, and one or more low-priority threads 214. As used herein, a high-priority thread has a higher priority than a low-priority thread, and refers to a thread requiring high performance or low execution latency. A "low-priority thread" refers to a thread for which low execution performance or high execution latency is acceptable. Thread priority is assigned to a thread by the operating system, middleware, or kernel, depending on the type of system, and is often user and system-defined. For example, a user may wish to specify when a thread is high-priority (such as a thread running an algorithm for stock trading), whereas a second thread is low-priority (such as a thread for payroll processing). By way of example, the kernel may then add an even higher-priority thread, for example, for critical device drivers.

Figure 3:
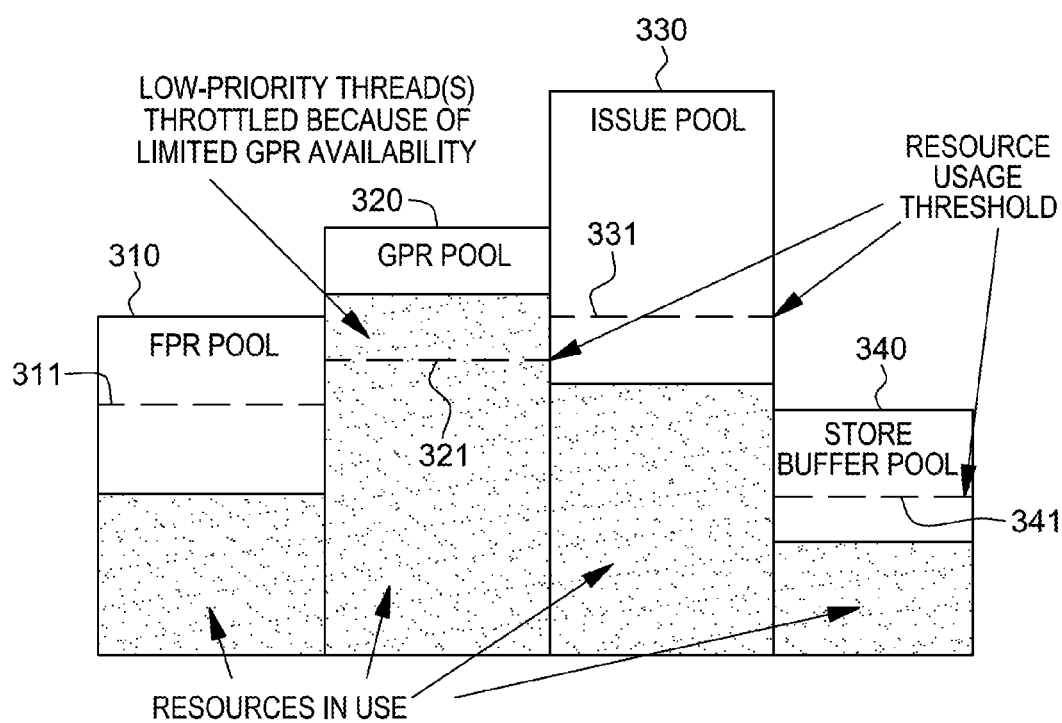
FIG. 3 depicts one embodiment of multiple pools of resources to be used in execution of threads and illustrates resource usage thresholds associated with the pools for use in separately managing dispatching of resources in the pools, in accordance with one or more aspects of the present invention.

As illustrated in FIG. 3, the pools of available system resources may comprise multiple pools of hardware resources 300, including a floating point register pool 310, a general purpose register pool 320, an issue register pool 330, and a store buffer pool 340. Each pool of available resources 310, 320, 330 & 340 has an associated resource usage threshold 311, 321, 331 & 341, respectively, each of which may be an adjustable threshold, as described herein. Note also that, as illustrated in FIG. 3, each pool may comprise a different amount of resources, and the resource usage thresholds associated with the pools may, initially and/or by operation of the adjustment process disclosed herein, be at different percent levels in the different pools.

In one embodiment, the respective resource usage thresholds of the various pools of resources are dynamically adjusted. This is because the optimum threshold level for any given resource pool depends on the nature of the high-priority thread(s) being executed, and thread nature can vary significantly from one workload to the next. For example, if the high-priority thread(s) does not execute floating point instructions, then restricting dispatch of a low-priority thread because the pool of floating point registers 310 (FIG. 3) has reached the resource usage threshold 311, would reduce performance on the low-priority thread and provide no benefit to the high-priority thread(s).

One example of a dynamically adjustable threshold approach would be one that starts at a default threshold level of, for example, 90%, meaning that 90% of each pool of resources at the start is available to low-priority threads, such that the low-priority threads do not initially incur any dispatch throttling. The dispatch rate of the high-priority thread(s) is monitored using, for example, a counter which counts the average number of dispatches for the thread per cycle. If a high-priority thread makes little use of a particular resource type (such as a floating point register, for example), then that threshold level can be incrementally increased by, for example, one or more registers (or resources) at a time, over a period of a certain number of clock cycles, for example, 1024. Note that the number of clock cycles in the period of threshold adjustment may be a programmable setting, and the incremental adjustment may be based on performance tests for the type of workload for which the machine is being used, or based on real-time measurements. Alternatively, if the high-priority thread heavily utilizes a particular resource, or incurs a stall due to resource contention on a given resource, then the threshold level for that resource pool may be incrementally decreased, for example, by one or more registers (or resources) at a time. In this case, the low-priority thread(s) is in the dispatch throttled state, and remains in that state until the number of resources in the contended resource pool falls back below the adjusted resource usage threshold. If the high-priority thread continues to undergo resource contention for a programmable period of time, for example, 1024 clock cycles, then the threshold on that contended resource pool can continue to fall until, for example, it reaches a programmable minimum level, such as 25% of the total pool size. These programmable settings may be set up in advance at machine initialization, or may be part of a greater dynamic load balancing system or control.

Figure 4A:
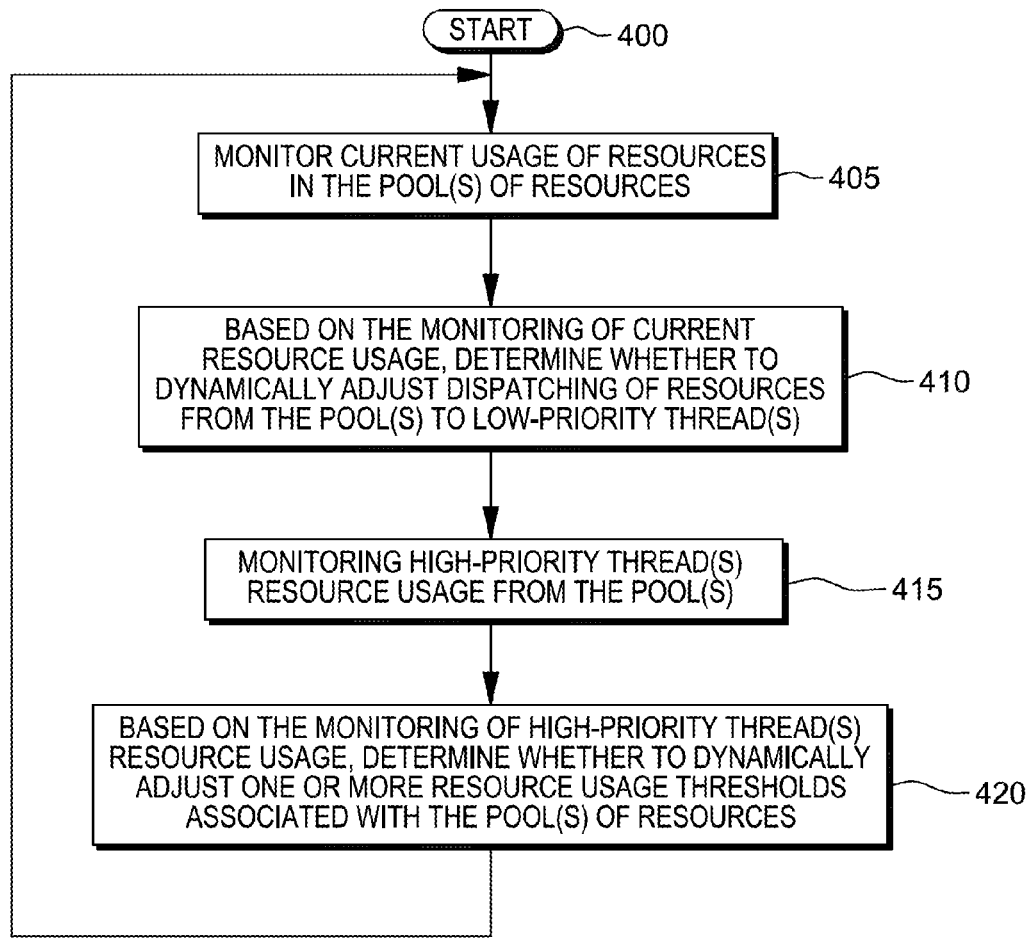
FIG. 4A depicts one embodiment of logic for managing dispatching of resources from one or more pools of resources used in execution of threads, in accordance with one or more aspects of the present invention.
Figure 4B:
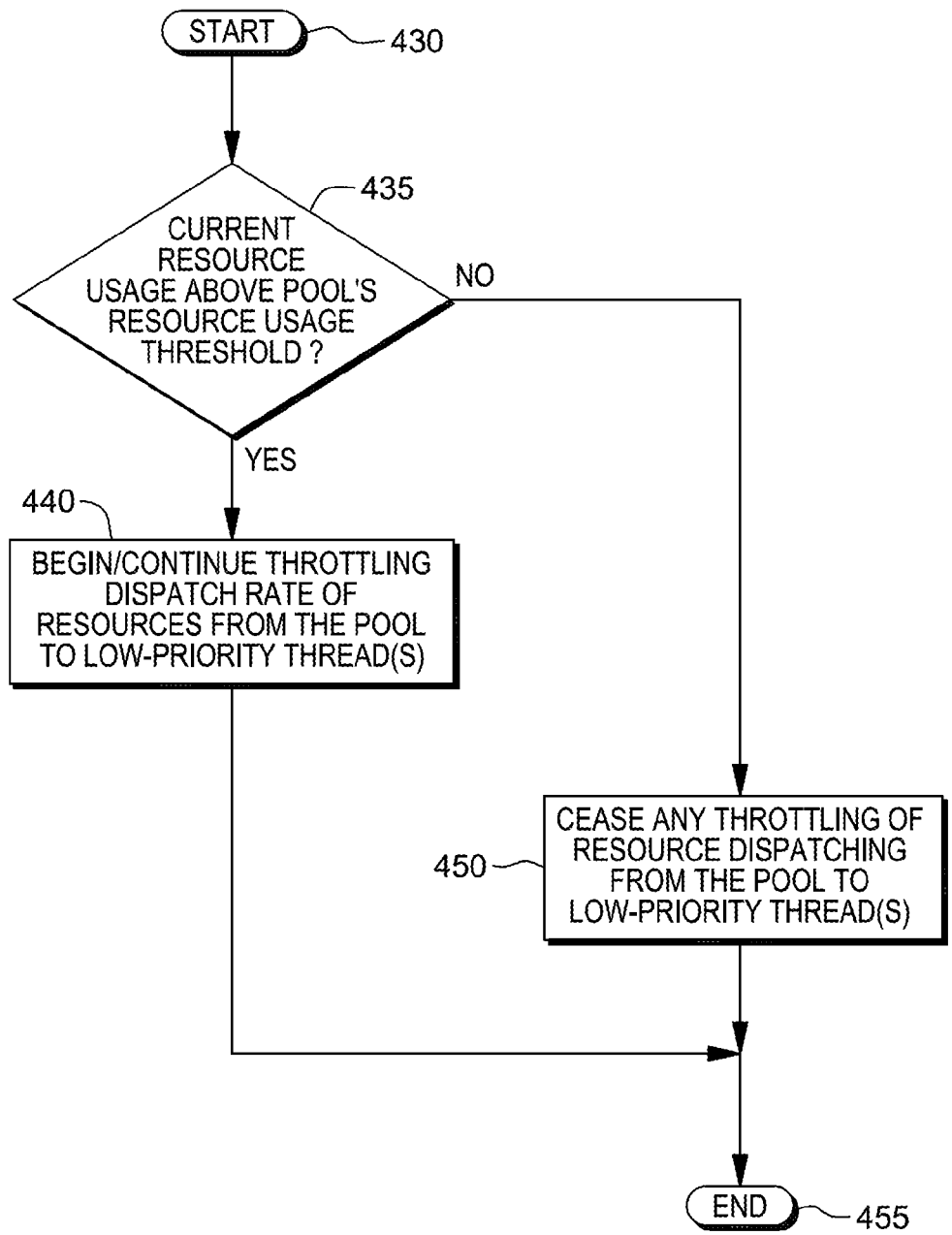
FIG. 4B depicts one embodiment of logic for adjusting dispatching of resources from one pool of the one or more pools of resources to one or more low-priority threads of the computing environment, in accordance with one or more aspects of the present invention.
Figure 4C:
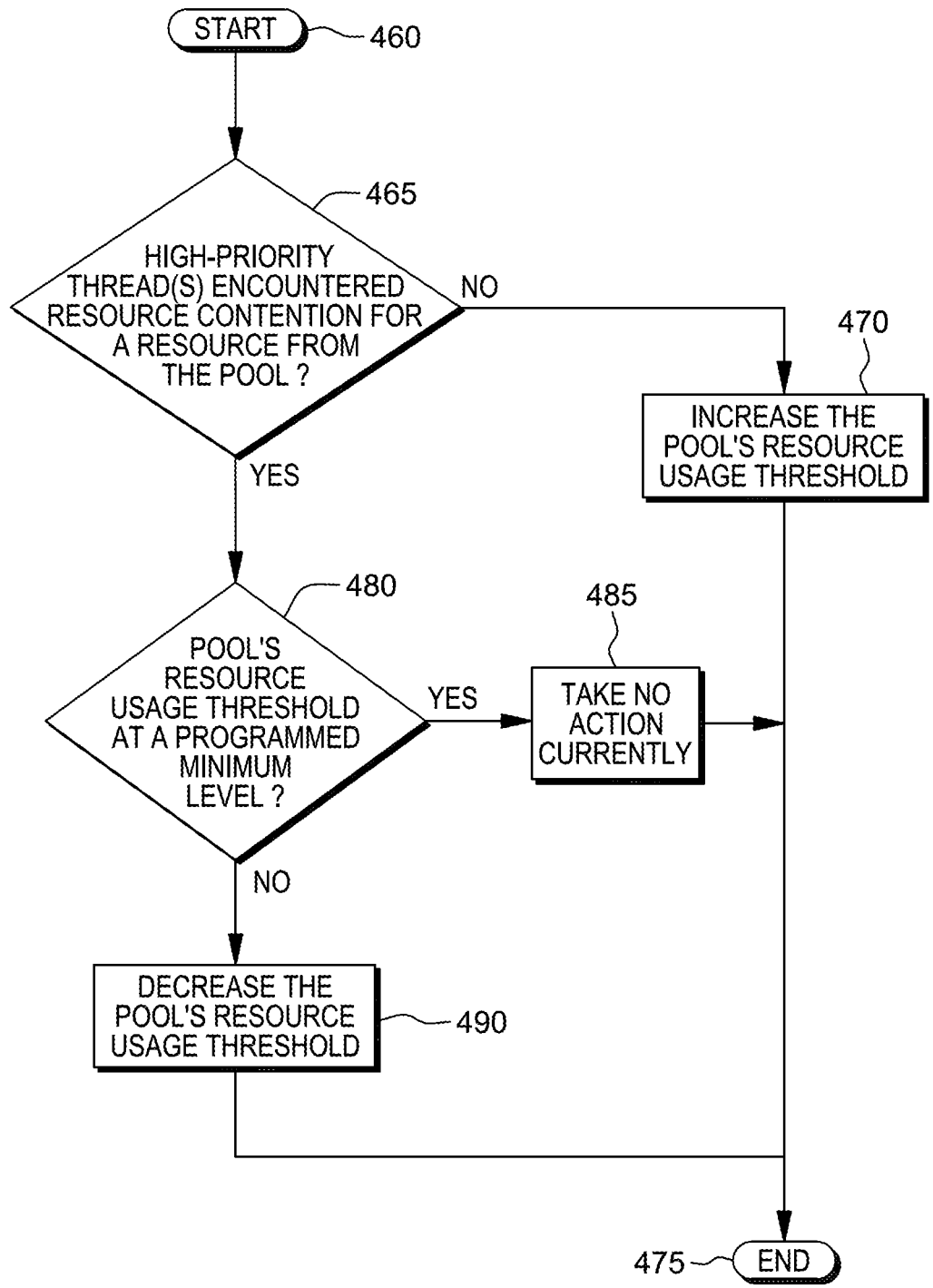
FIG. 4C depicts one embodiment of logic for dynamically adjusting the resource usage threshold employed in triggering the adjusting dispatching of resources to the one or more low-priority threads, in accordance with an aspect of the present invention.

FIGS. 4A-4C depict one embodiment of logic, in accordance with one or more aspects of the present invention.

Referring to FIG. 4A, the hardware controller initiates, STEP 400, management processing by monitoring current usage of resources in one or more pools of available resources, STEP 405, such as the above-discussed pools of system registers illustrated in FIG. 3. Based on the monitoring of current resource usage, the controller determines whether to dynamically adjust dispatching of resources from one or more of the pools to low-priority threads being executed, STEP 410. FIG. 4B depicts one embodiment of such processing.

Referring to FIG. 4B, the controller begins, STEP 430, with determining whether current resource usage in the pool is above the pool's resource usage threshold, STEP 435. If "yes", then the controller begins or continues with dynamic throttling of a dispatch rate of resources from that pool to one or more low-priority threads, STEP 440, which completes the dynamic adjustment of dispatching, STEP 455. If current resource usage in the pool is not above the pool's resource usage threshold, then processing ceases any throttling of resource dispatching from the pool to low-priority threads, STEP 450, before completing, STEP 455. Note that in accordance with this processing, once the dispatch rate is throttled, the low-priority threads remain in a dispatch throttled state until the current resource usage falls back below the pool's resource usage threshold.

Continuing with the logic of FIG. 4A, processing monitors resource usage in the pool by high-priority threads, STEP 415, and based on the monitoring of high-priority resource usage, determines whether to dynamically adjust one or more usage threshold levels associated with the pools of resources, STEP 420. One embodiment if this logic is depicted in FIG. 4C.

Referring to FIG. 4C, processing begins, STEP 460, by determining whether the high-priority thread(s) has encountered resource contention for a resource in a particular pool, STEP 465. If "no", then that pool's associated resource usage threshold may be incrementally increased, STEP 470, which completes the dynamic adjustment processing, STEP 475.

As described above, resource contention, or more generally, dispatch rate, of the high-priority thread(s) may be monitored using a counter which counts the average number of dispatches for the thread per cycle. If the high-priority thread encounters no resource contention despite a given resource usage threshold having been reached for a pool, then that threshold can be incrementally increased by (for example) one or two resources at a time over a period of a certain number of clock cycles (with the clock cycles being a programmable setting). The desired incremental increase (which in another embodiment may be a number of resources other than one or two) may be based on performance tests of the types of workloads for which the machine is being used or, for example, based on real-time measurements. Note that in this example, increasing the pool's resource usage threshold may depend on whether the low-priority thread(s) is currently in a dispatch throttle state. That is, if the low-priority thread(s) is not currently being throttled, then there may be no need to increase the pool's resource usage threshold. In another embodiment, the types of resources used by a high-priority thread may be monitored to determine if the resource threads in the resource pools should be adjusted over time. For example, if a particular thread makes heavy usage of floating point registers and light usage of fixed point registers, then the resource threshold for a floating point register pool may be decreased, and the threshold for a fixed point register pool may be increased.

Assuming that the high-priority thread did encounter resource contention for a resource from the pool, then processing inquires whether that pool's resource usage threshold is at a predefined or programmed minimum level, STEP 480, and if so, no action is currently taken, STEP 485. Otherwise, processing decreases the pool's resource usage threshold to enhance the likelihood of throttling the dispatch rate of resources from the pool to the low-priority threads, STEP 490. This completes threshold level adjustment processing for a pool, STEP 475. Note that in one embodiment, the processing of FIGS. 4A-4C may occur separately in parallel for each pool of system resources (such as hardware registers) being employed in execution of the multiple threads.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
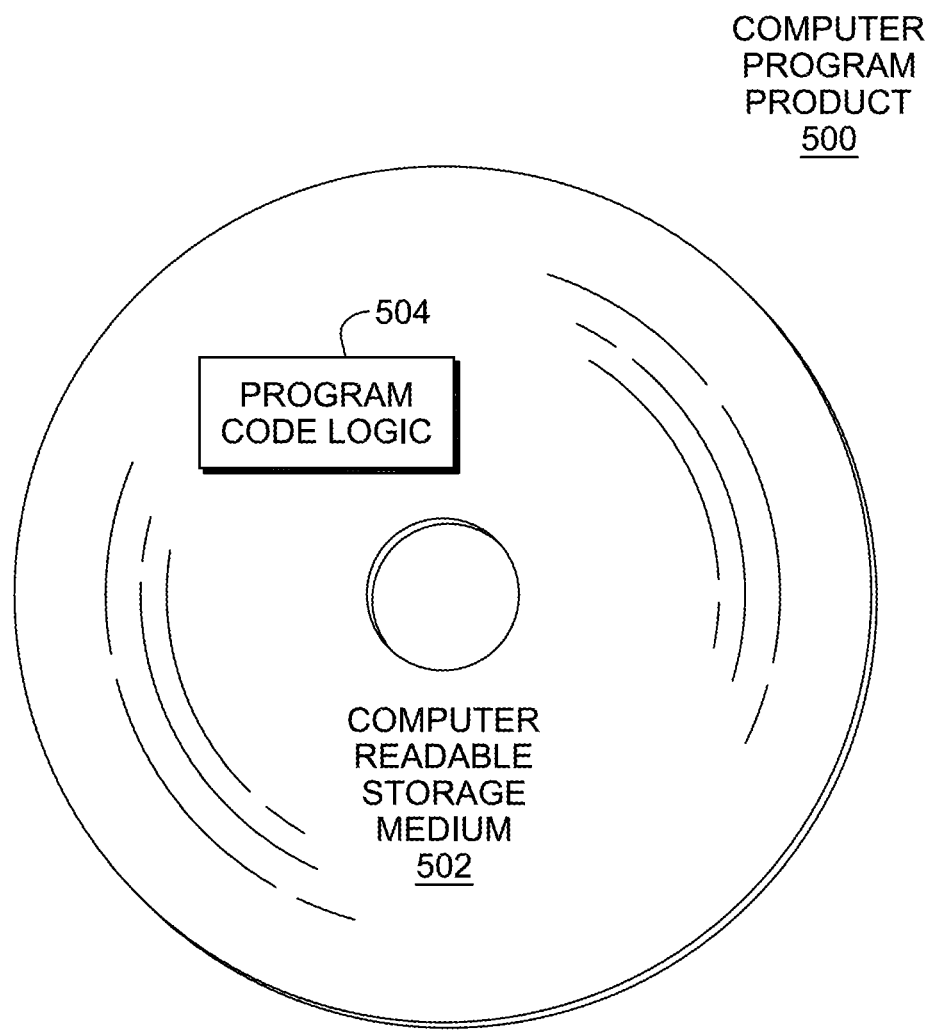
FIG. 5 depicts one embodiment of a computer program product incorporating one or more aspects of the present invention.

Referring now to FIG. 5, in one example, a computer program product 500 includes, for instance, one or more non-transitory computer readable storage media 502 to store computer readable program code means or logic 504 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, a central processor may include more or less processors than described herein. Yet further, processors may include more or less threads than described herein. Yet further, the processors need not be part of a central processor. Many other changes may also be made.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features.

Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer program product for facilitating managing of resources in a computing environment, the computer program product comprising:
   a non-transitory computer readable storage medium readable by a processing circuit and storing instructions for execution by the processing circuit for performing a method comprising:
   controlling, by a hardware controller, dispatching and dispatching rate of resources from at least one pool of resources to be used in execution of threads, the controlling comprising conditionally dispatching resources from one pool of resources of the at least one pool of resources to at least one low-priority thread of the computing environment based on usage of resources in the one pool of resources relative to a resource usage threshold associated with the one pool of resources, wherein the one pool of resources comprises resources of one selected type of resource, and wherein the resource usage threshold indicates a level at which dispatching of low-priority threads is to at least be throttled.

2. The computer program product of claim 1, wherein the one pool of resources comprises resources exclusively of the one selected type of resource.

3. The computer program product of claim 1, wherein the method further comprises:
   monitoring dispatching of resources from the one pool of resources; and
   based on the monitoring, dynamically adjusting the resource usage threshold associated with the one pool of resources.

4. The computer program product of claim 1, wherein the controlling dispatching of resources comprises controlling dispatching of resources from at least one pool of resources of multiple pools of resources, and wherein the method further comprises:
   monitoring dispatching of resources from one or more pools of resources of the multiple pools of resources to at least one high-priority thread of the computing environment; and
   based on the monitoring, dynamically adjusting one or more resource usage thresholds associated with one or more pools of resources of the multiple pools of resources.

5. The computer program product of claim 4, wherein the monitoring dispatching of resources from one or more pools of resources includes monitoring dispatching of resources from the one pool of resources, and wherein the dynamically adjusting one or more resource usage thresholds includes dynamically adjusting the resource usage threshold associated with the one pool of resources, and wherein the dynamically adjusting the resource usage threshold associated with the one pool of resources comprises dynamically adjusting the resource usage threshold based on types of resources used by the at least one high-priority thread.

6. The computer program product of claim 4, wherein the monitoring dispatching of resources from one or more pools of resources includes monitoring dispatching of resources from the one pool of resources, and wherein the dynamically adjusting one or more resource usage thresholds includes dynamically adjusting the resource usage threshold associated with the one pool of resources, and wherein the dynamically adjusting the resource usage threshold associated with the one pool of resources comprises dynamically adjusting the resource usage threshold based on whether the at least one high-priority thread encounters resource contention for one or more resources of the one pool of resources.

7. The computer program product of claim 6, wherein the dynamically adjusting the resource usage threshold associated with the one pool of resources comprises incrementally increasing the resource usage threshold associated with the one pool of resources based on the at least one high-priority thread not encountering resource contention for the one or more resources of the one pool of resources.

8. The computer program product of claim 6, wherein the dynamically adjusting the resource usage threshold associated with the one pool of resources further comprises, based on the at least one high-priority thread encountering resource contention for the one or more resources of the one pool of resources, determining whether the resource usage threshold associated with the one pool of resources is at a programmed minimum level, and based on the resource usage threshold being at the programmed minimum level, taking no action to further adjust the resource usage threshold, otherwise incrementally decreasing the resource usage threshold associated with the one pool of resources.

9. The computer program product of claim 1, wherein the controlling dispatching of resources comprises controlling dispatching of resources from at least one pool of resources of multiple pools of resources, and wherein the method further comprises:
monitoring dispatching of resources from one or more pools of resources of the multiple pools of resources to at least one low-priority thread of the computing environment; and
based on the monitoring, dynamically adjusting one or more resource usage thresholds associated with one or more pools of resources of the multiple pools of resources.

10. The computer program product of claim 1, wherein the conditionally dispatching of resources from the one pool of resources comprises dynamically throttling a dispatch rate of resources from the one pool of resources to the at least one low-priority thread based on the usage of resources in the one pool of resources exceeding the resource usage threshold associated with the one pool of resources.

11. The computer program product of claim 10, wherein the conditionally dispatching of resources from the one pool of resources further comprises discontinuing the throttling of the dispatch rate of resources to the at least one low-priority thread based on the usage of resources in the one pool of resources dropping below the resource usage threshold associated with the one pool of resources.

12. A computer system for facilitating managing of resources in a computing environment, the computer system comprising:
a memory; and
a processor in communication with the memory, wherein the computer system is configured to perform a method, said method comprising:
controlling, by a hardware controller, dispatching and dispatching rate of resources from at least one pool of resources to be used in execution of threads, the controlling comprising conditionally dispatching resources from one pool of resources of the at least one pool of resources to at least one low-priority thread of the computing environment based on usage of resources in the one pool of resources relative to a resource usage threshold associated with the one pool of resources, wherein the one pool of resources comprises resources of one selected type of resource, and wherein the resource usage threshold indicates a level at which dispatching of low-priority threads is to at least be throttled.

13. The computer system of claim 12, wherein the one pool of resources comprises resources exclusively of the one selected type of resource.

14. The computer system of claim 12, wherein the method further comprises:
monitoring dispatching of resources from the one pool of resources; and
based on the monitoring, dynamically adjusting the resource usage threshold associated with the one pool of resources.

15. The computer system of claim 12, wherein the controlling dispatching of resources comprises controlling dispatching of resources from at least one pool of resources of multiple pools of resources, and wherein the method further comprises:
monitoring dispatching of resources from one or more pools of resources of the multiple pools of resources to at least one high-priority thread of the computing environment; and
based on the monitoring, dynamically adjusting one or more resource usage thresholds associated with one or more pools of resources of the multiple pools of resources.

16. The computer system of claim 15, wherein the monitoring dispatching of resources from one or more pools of resources includes monitoring dispatching of resources from the one pool of resources, and wherein the dynamically adjusting one or more resource usage thresholds includes dynamically adjusting the resource usage threshold associated with the one pool of resources, and wherein the dynamically adjusting the resource usage threshold associated with the one pool of resources comprises dynamically adjusting the resource usage threshold based on types of resources used by the at least one high-priority thread.

17. The computer system of claim 12, wherein the controlling dispatching of resources comprises controlling dispatching of resources from at least one pool of resources of multiple pools of resources, and wherein the method further comprises:
monitoring dispatching of resources from one or more pools of resources of the multiple pools of resources to at least one low-priority thread of the computing environment; and based on the monitoring, dynamically adjusting one or more resource usage thresholds associated with one or more pools of resources of the multiple pools of resources.

18. The computer system of claim 12, wherein the conditionally dispatching of resources from the one pool of resources comprises dynamically throttling a dispatch rate of resources from the one pool of resources to the at least one low-priority thread based on the usage of resources in the one pool of resources exceeding the resource usage threshold associated with the one pool of resources.

19. The computer system of claim 18, wherein the conditionally dispatching of resources from the one pool of resources further comprises discontinuing the throttling of the dispatch rate of resources to the at least one low-priority thread based on the usage of resources in the one pool of resources dropping below the resource usage threshold associated with the one pool of resources.

20. A method of facilitating managing of resources in a computing environment, the method comprising:

controlling, by a hardware controller, dispatching and dispatching rate of resources from at least one pool of resources to be used in execution of threads, the controlling comprising conditionally dispatching resources from one pool of resources of the at least one pool of resources to at least one low-priority thread of the computing environment based on usage of resources in the one pool of resources relative to a resource usage threshold associated with the one pool of resources, wherein the one pool of resources comprises resources of one selected type of resource, and wherein the resource usage threshold indicates a level at which dispatching of low-priority threads is to at least be throttled.

21. The method of claim 20, further comprising:

monitoring dispatching of resources from the one pool of resources; and based on the monitoring, dynamically adjusting the resource usage threshold associated with the one pool of resources.

* * * * *